UNITED STATES PATENT OFFICE.

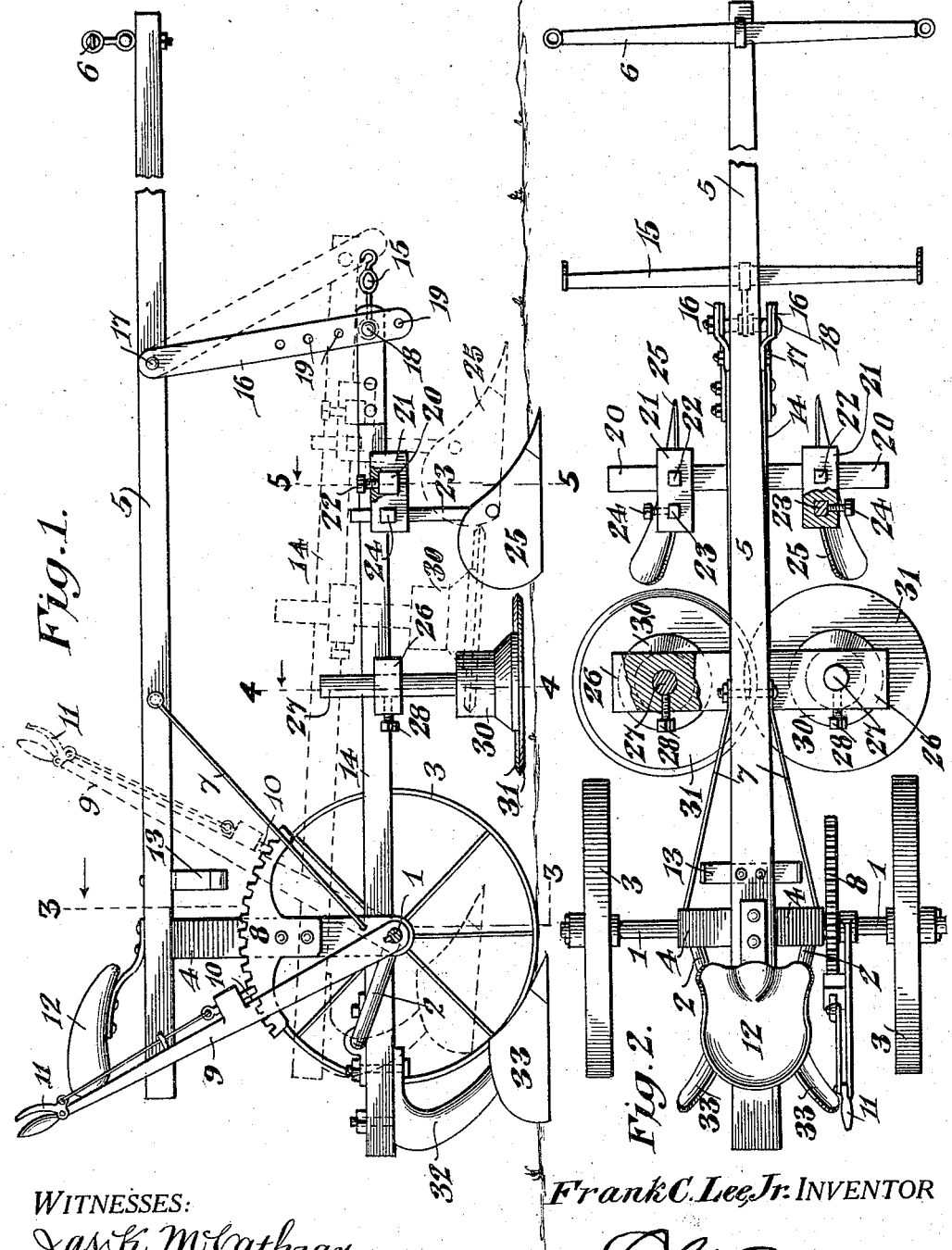

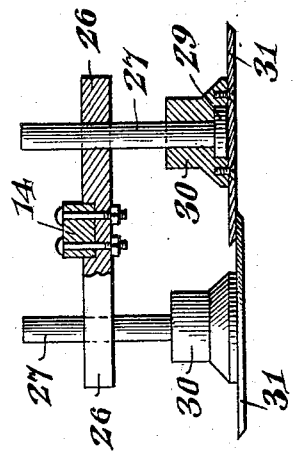
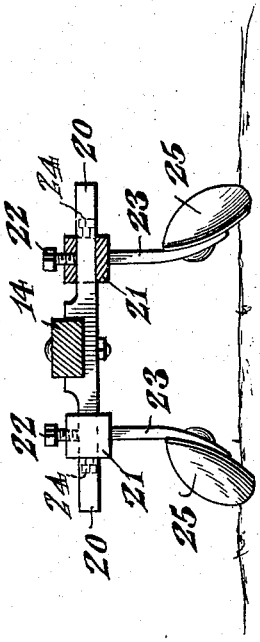
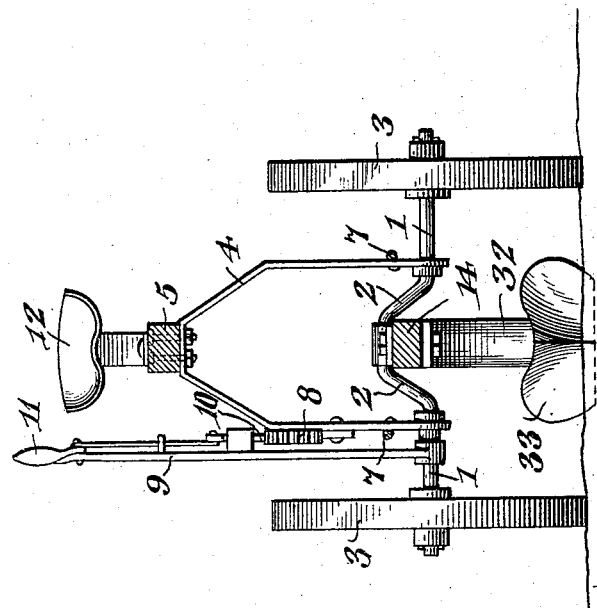

FRANK C. LEE, JR., OF CUT OFF, LOUISIANA.

POTATO-DIGGER.

1,185,111.  Specification of Letters Patent.  Patented May 30, 1916.

Application filed April 30, 1915. Serial No. 24,994.

*To all whom it may concern:*

Be it known that I, FRANK C. LEE, Jr., a citizen of the United States, residing at Cut Off, in Lafourche parish and State of Louisiana, have invented a new and useful Potato-Digger, of which the following is a specification.

This invention has reference to potato diggers and its object is to provide a machine whereby the ground on opposite sides of a row of potatoes may be loosened, the tops of the vines severed from the tuber ends, and the potatoes lifted from the ground in the order named.

In accordance with the present invention there is provided a vehicle with a longitudinal beam carrying near the forward end plow shares so arranged as to travel on opposite sides of a row of potatoes and loosen the dirt and throw it to opposite sides of the row. At a suitable distance to the rear of the plow shares the beam carries cutting disks severing the tops of the vines from the potatoes by the travel of the vehicle and at a point still farther back the beam carries a lifting plow of a character to underride and elevate the tubers to the surface of the ground. The structure also includes means for the adjustment of the ground devices to any suitable depth or the lifting thereof from the ground for the transportation of the machine from place to place.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of the potato digger. Fig. 2 is a plan view thereof with some parts in section. Fig. 3 is a section on the line 3—3 of Fig. 1. Fig. 4 is a section on the line 4—4 of Fig. 1, distant parts being omitted. Fig. 5 is a section on the line 5—5 of Fig. 1 with distant parts omitted.

Referring to the drawings there is shown an axle 1 having an intermediate crank portion 2. At the ends of the axle are supporting wheels 3 and mounted on the axle between the wheels and exterior to the crank portion 2 is an upright arch 4 to which is attached one end of a pole 5, the other end of which carries a cross bar 6, whereby the corresponding end of the pole may be upheld by draft animals. To strengthen the parts the legs of the arch 4 are connected by brace rods 7 to the pole 5. Fast to one of the side members or legs of the arch 4 is a segmental rack 8 and fast to the axle is a lever 9 carrying a pawl 10 in operative relation to the rack 8 and under the control of an operating member 11 on the handle end of the lever 9. Carried by the pole 5 near the arch 4 is a seat 12, and the lever 9 is so related to the seat 12 that an operator on the seat 12 has ready access to the lever. The pole 5 near the seat 12 carries foot rests 13 for the operator. Mounted on the crank portion 2 of the axle is one end of a beam 14 below and extending lengthwise of the pole 5, but considerably shorter than the pole 5. Fast to the front end of the beam is a whiffletree 15 to which draft animals may be attached.

The beam 14 being attached to the axle 2 near one end of the beam has its other end supported by links 16 each connected to the pole 5 by a pivot 17 and near the other end connected to the beam by a pivot or bolt 18 extended through any one of a longitudinal series of perforations 19 in each link 16. By this means the beam 14 is raised or lowered, as the case may be, by a suitable manipulation of the lever 9 and may be locked in any desired position by the engagement of the pawl 10 between teeth of the rack 8. One of the adjusted positions is shown in dotted lines in Fig. 1. Near the end of the beam 14 carried by the links 16, which end may be termed the front end, the beam has fast thereto a cross bar 20 having blocks 21 slidably mounted thereon on opposite sides of the beam. These blocks are held at different distances from the beam by set screws 22. Extending through each block 21 is a standard 23 held in any position of vertical adjustment by a set screw 24 and carrying at the lower end a turning share 25. The shares on the opposite side of the beam are arranged to engage the ground on opposite sides of a row of potatoes and lift and move the ground laterally away from the row, so as to form shallow trenches on each side of the row of potatoes.

At an appropriate distance farther back than the cross bar 20 is another cross bar 26 carried by the beam 14. This cross bar is traversed by upright stems 27 adjustable up and down and held in adjusted positions by set screws 28. Each stem 27 at the lower end is formed with a head 29 and carries a hub 30 capable of free rotation on the stem and the hub 30 has fast thereto a cutting disk 31. The arrangement is such that one disk 31 overrides the other disk 31, there being like disks on opposite sides of the beam 14, and this overriding or overlapping of the disks is sufficient to cause a shearing off of the tops or vines of the potatoes close to the ground. The shearing is due to the engagement of the tops with the two overlapping disks, which latter are caused to rotate by their travel over the plants in engagement with the stems thereof. Still farther back of the beam 14 and at substantially the rear end of the latter, there is made fast a plow standard 32 carrying a double wing or shovel plow 33 with its point in the center line of travel and arranged to direct dirt engaged by it on opposite sides of such center line of travel. The double wing plow 33 is designed to enter the ground a sufficient distance to engage and lift the tubers to the surface of the ground, so that they are then readily accessible.

With a machine such as described the ground on opposite sides of a row of potatoes is loosened and diverted therefrom and then the tops of the vines are severed from the tuber ends thereof, after which the tubers in most part freed from the vines or tops are lifted from the ground and deposited on opposite sides of the center line in the trenches already formed by the plow shares 25 and in position to be readily picked up after the passage of the potato digging machine.

The ground entering parts are under the control of the operator at all times to be manipulated as occasion may demand, or to be lifted free from the ground when it is desired to transport the machine from one place to another.

The machine is marked by extreme simplicity of construction and wide range of adjustability and adaptability, and is particularly intended for the digging of potatoes. Moreover, the machine is entirely free from mechanism requiring additional power to set it in motion.

What is claimed is:—

1. A potato digger comprising a vehicle with a longitudinal beam, turning shares on opposite sides of the beam near the front end thereof and being outwardly directed for moving the earth away from the center line of travel, freely rotatable coacting cutting disks at the rear of the plows, a double-wing plow in the center line of travel at the rear of the cutters, adjusting means for the shares, disks, and the double wing plow to adjust the same individually upon the beam and relatively to one another, and means for adjusting the beam to simultaneously adjust the shares, disks, and double wing plow without disturbing their mutual adjustment.

2. A potato digger provided with a central longitudinal beam, a cross bar near the front of the beam having blocks thereon adjustable laterally with respect to the beam, plow shares on opposite sides of the beam carried by the blocks and adjustable therein toward and from the ground, another cross bar to the rear of the first-named cross bar and carrying stems adjustable toward and from the ground, said stems each having at its lower end a freely rotatable disk cutter overlapping the adjacent cutter in the center line of travel, and a double wing plow at the rear end of the beam.

3. A potato digger comprising a vehicle with a pole thereon in the center line of the vehicle, a beam extending in the center line of the vehicle and adjustably supported thereon for up and down movements, a cross bar near the front of the beam with plows carried thereby on opposite sides of the beam and each plow mounted for up and down adjustment and also for adjustments toward and from the beam, another cross bar carried by the beam to the rear of the first cross bar and carrying overlapping disk cutters on opposite sides of the beam, said cutters being adjustable up and down with relation to the beam, and a double wing plow carried by the beam back of the cutters.

4. A potato digger comprising a vehicle having a crank axle, supporting wheels mounted on the axle, an arch frame carried by the axle on opposite sides of the crank, a pole carried by the frame and provided with means for the attachment of draft animals, a beam mounted near the rear end on the crank of the crank axle, adjustable links supporting the front end of the beam and pivotally connected to the beam and pole to swing in a plane lengthwise of the beam, means at the front end of the beam for the attachment of draft animals, laterally and vertically adjustable plows on opposite sides of the beam near the front end of the latter, vertically adjustable freely rotatable disk cutters in overlapping relation carried by the beam to the rear of the plows, a double wing plow at the rear of the beam, and means for turning the axle to raise and lower the beam by the action of the crank part of the axle thereon.

5. A potato digger comprising a frame, a beam on the frame, a plurality of implements mounted for independent adjustment on the beam to position the implements relatively to each other and to the row, and adjusting means between the frame and the beam to adjust the latter without disturbing the mutual relation between the implements and to admit the same relative application of the implements to the row irrespective of the rise and fall of the frame.

6. A potato digger comprising a plow beam, a double wing plow secured to the rear end of the beam to enter the ground and lift the potatoes, a pair of cutting disks mounted on the beam in front of the double wing plow to cut stalks prior to lifting the potatoes, and being adjustable on the beam relatively to the double wing plow to sever the stalks at the desired height above the potatoes, a pair of turning shares mounted on said beam forwardly of the cutting disks and the plow, and being adjustable on the beam relative to the disks and the plow to turn the earth to the desired depth away from the sides of the stalks prior to the cutting of the same and the lifting of the potatoes, a main frame connected to the beam for carrying the same and all of said elements mounted thereon, and adjusting means between the beam and the frame to adjust the double wing plow, the disks and the shares simultaneously and without disturbing their mutual relation to accommodate the wheels of the frame to furrows of different depths without the separate adjustment of said elements.

7. A potato digger comprising a pole, a vertical arch secured at its intermediate portion to the rear end of the pole, diagonal brace rods extending downwardly from an intermediate portion of the pole and secured to the lower ends of said vertical arch to hold the same in upright position, an axle journaled in the lower ends of the arch and having a crank portion between the ends of the arch to be swung up into the same, a hand lever fixed to the axle to turn the same, a sector carried at the side of the arch over which the lever is adapted to move for securing the lever in adjusted position, a beam hinged at its rear end to the crank portion of said axle, links hinged to the forward ends of the pole and the beam to support the latter, and admit swinging thereof when the axle is turned, a double wing plow on the rear end of said beam, cutting disks intermediate the ends of the beam, and opposed turning shares at the forward end of the beam, said disks and shares being adjustable on the beam relatively to said plow to obtain the desired mutual relations of the same with respect to the row to be worked, the hand lever being adapted to be swung into the desired angle and secured thereat to hold the beam in a vertically adjusted position without disturbing the mutual relation between the plow, the disks and the shares on the beam.

In testimony, that I claim the foregoing as my own, I have hereto affixed my signature in the presence of two witnesses.

FRANK C. LEE, Jr.

Witnesses:
JACKSON PETIT,
WALLACE DUCT.